June 24, 1930. J. C. HAGEY Re. 17,716

DEVICE FOR CONTROLLING AIR PRESSURE

Original Filed Jan. 20, 1917 4 Sheets-Sheet 1

Inventor.
J. Clarke Hagey
Jones, Addington, Ames + Seibold
Attys.

June 24, 1930. J. C. HAGEY Re. 17,716

DEVICE FOR CONTROLLING AIR PRESSURE

Original Filed Jan. 20, 1917 4 Sheets-Sheet 2

Inventor:
J. Clarke Hagey
Jones, Addington, Ames & Seifold
Attys.

June 24, 1930. J. C. HAGEY Re. 17,716

DEVICE FOR CONTROLLING AIR PRESSURE

Original Filed Jan. 20, 1917 4 Sheets-Sheet 3

Inventor.
J. Clarke Hagey
Jones, Waldo, Holbrook & McCoy
Attys.

June 24, 1930. J. C. HAGEY Re. 17,716

DEVICE FOR CONTROLLING AIR PRESSURE

Original Filed Jan. 20, 1917 4 Sheets-Sheet 4

Inventor.
J. Clarke Hagey
Jones, Addington, Ames + Seibold
Attys.

Reissued June 24, 1930 Re. 17,716

UNITED STATES PATENT OFFICE

JAMES CLARKE HAGEY, OF CHICAGO, ILLINOIS, ASSIGNOR TO THE CABLE COMPANY, OF CHICAGO, ILLINOIS, A CORPORATION OF ILLINOIS

DEVICE FOR CONTROLLING AIR PRESSURE

Original No. 1,359,698, dated November 23, 1920, Serial No. 143,463, filed January 20, 1917. Application for reissue filed November 18, 1922. Serial No. 601,841.

My invention relates to devices for controling air-pressure and, more specifically, to devices for controlling the air-pressure in the action of automatic musical instruments.

One of the objects of my invention is to provide such a device which will be efficient in operation and simple in construction.

A further object of my invention is to provide an improved device of the character indicated by means of which the degree of rarefaction of the air in the action of an automatic musical instrument may be varied, either automatically or manually, and which will be prompt and reliable in action under the varying conditions found in practice.

Further objects will appear from the detailed description to follow and from the appended claims.

In the drawings, in which one form of my invention is shown,

Fig. 12 is a vertical section, on the line 12—12 of Fig. 1, showing the manually operable levers for controlling the air-pressure;

Fig. 13 is an enlarged detailed view, showing a spring for frictionally holding one of the manually operable levers in position.

Figure 1:
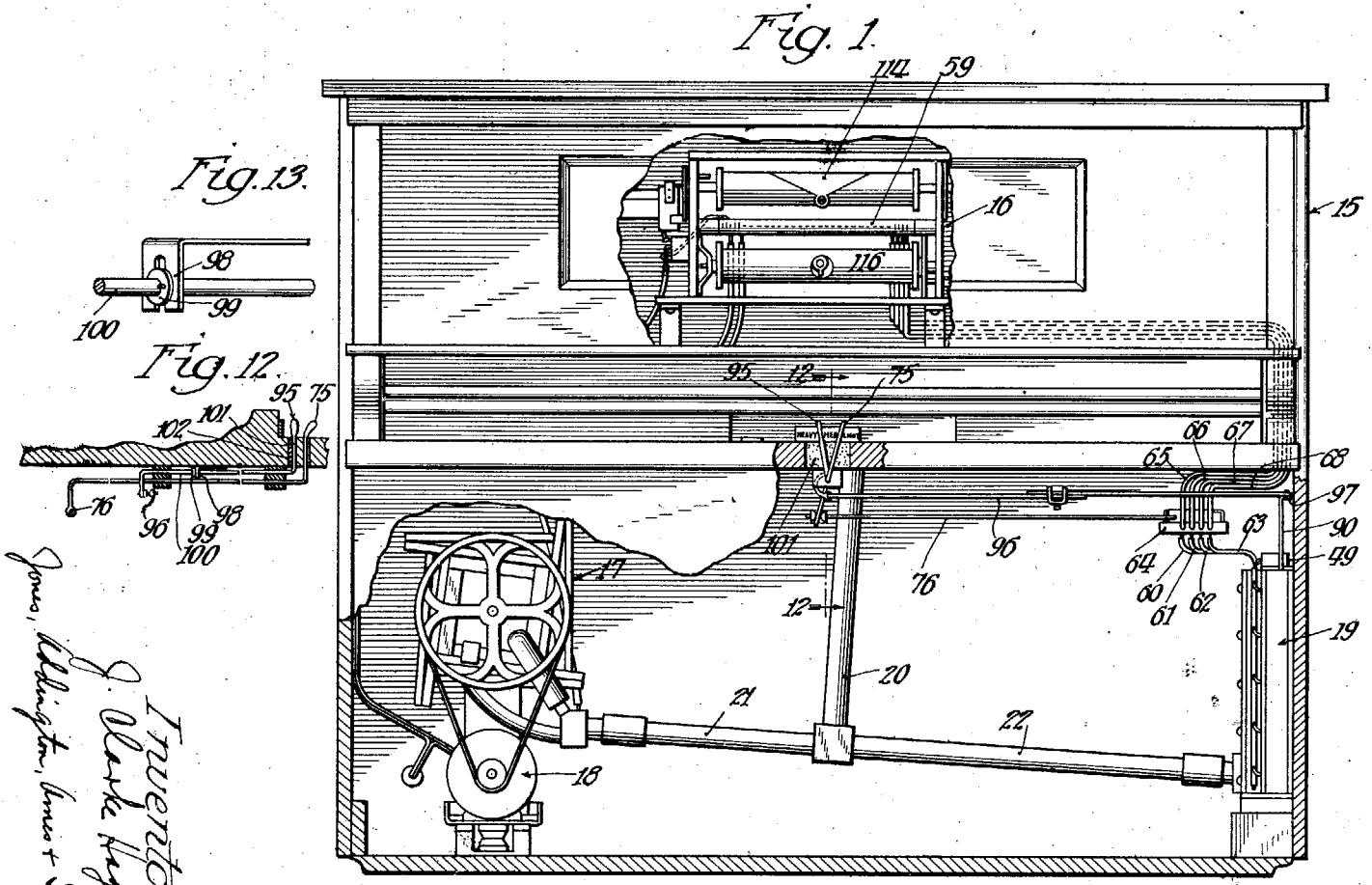
Figure 1 is a front elevation of a player-piano embodying my invention, parts being broken away to show the interior construction.

Referring now to the drawings in detail, the player-piano shown is of the pneumatic type, comprising a casing 15; selector-mechanism 16, located in the upper part of the casing, for automatically controlling the various parts; an air-pump 17 and a motor 18, located in the lower part of the casing, for producing rarefaction of air in the action and motor-wind-chests (not shown); and air-pressure-controlling mechanism 19, for controlling the pressure of the air in the action wind-chest.

The air-pump 17 may be of any suitable type. It withdraws air from the action wind-chest through the communicating conduits 20 and 21.

Figure 9:
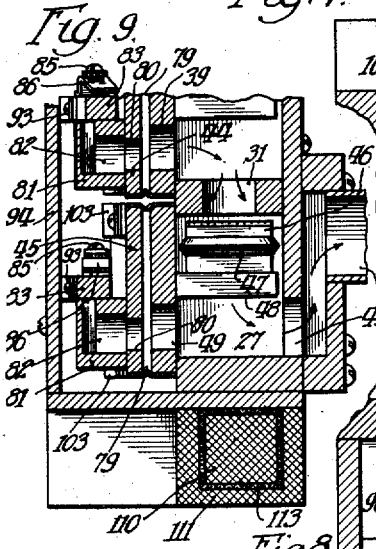
Fig. 9 is a vertical section, on the line 9—9 of Fig. 2.

The pressure-controlling mechanism 19 controls the air-pressure in the action wind-chest by placing the conduit 21 in communication with the atmosphere through the conduit 22. This pressure-controller 19 comprises a series of chambers 23, 24, 25, 26 and 27 in communication with each other, respectively, through ports 28, 29, 30 and 31; valve-mechanisms 32, 33, 34 and 35 for controlling the ports 28, 29, 30, and 31, respectively; ports 36, 37, 38, 39 and 40 for admitting air to the chambers 23, 24, 25, 26 and 27, respectively; and air-admission-controlling mechanisms 41, 42, 43, 44 and 45 for controlling the admission of air through the ports 36, 37, 38, 39 and 40, respectively. The lower chamber 27 is in communication with the conduit 22 through a port $45^a$ (Fig. 9).

Figure 6:
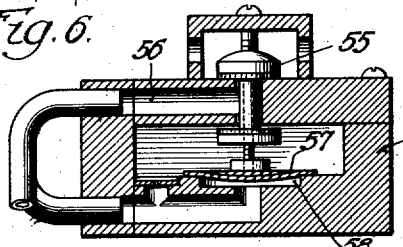
Fig. 6 is a vertical transverse section of a valve-action, on the line 6—6 of Fig. 2.

The valve-mechanisms 32, 33, 34 and 35 are substantially alike. Each comprises a valve proper 46 for closing its port, and a pneumatic 47, mounted on a support 48, for actuating the valve. The valve-mechanisms 32, 33, 34 and 35 are connected with primary valve-actions in the primary valve-chest 49 through the conduits 50, 51, 52 and 53, respectively. The primary valve-chest 49 is in communication with the chamber 27 through the conduit 54. The primary valve-actions may be of any suitable construction (Fig. 6).

Figure 4:
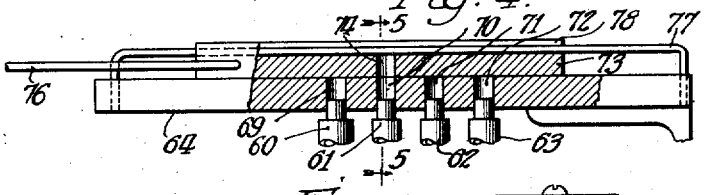
Fig. 4 is an elevation of a manually operable valve for controlling the air-pressure, parts being broken away.
Figure 5:
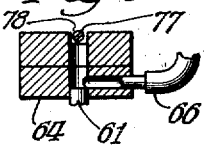
Fig. 5 is a section, on the line 5—5 of Fig. 4.

Each comprises a double valve 55, controlling a passage 56 leading to one of the conduits 50, 51, 52 or 53, and a diaphragm-pneumatic 57 for actuating valve 55. The chambers 58, under the diaphragm-pneumatics 57 corresponding to the valve-mechanisms 32, 33, 34 and 35, respectively, are in communication with ports in the tracker 59 through conduits 60, 61; 62 and 63, respectively, leading to the combined junction-and-valve-block 64, and through conduits 65, 66, 67 and 68, respectively, leading from the junction-block to the tracker (Figs. 1, 4 and 5).

The valve-block 64 is provided with ports 69, 70, 71 and 72, which communicate with the conduits 60, 61, 62 and 63, respectively, and are controlled by a slide-valve 73, which can be moved to bring an opening 74 therein into registration with any one of the ports 69, 70, 71 or 72. This slide-valve 73 is controlled by means of a manually operable lever 75, to which it is connected by means of a rod 76 (Figs. 1, 4 and 12). The slide-valve 73 is held in place and guided in its movement by means of a guide-rod 77, which engages a groove 78 in the slide-valve 73.

Each of the mechanisms 41, 42, 43, 44 and 45 for controlling the admission of air comprises a bellows 79, having its interior in communication with one of the ports 36, 37, 38, 39 or 40 and having a port 80 in its movable leaf, a port-block 81 having a passage 82 in communication with the port 80, a knife-valve 83 for controlling the flow of air into the passage 82, and an adjustable spring-mechanism 84 tending to hold the bellows 79 in open or expanded position.

The knife-valve 83 is pivotally mounted on a screw or post 85 and is held in place against the port-block 81 by means of a spring-member 86, which is also pivotally mounted on the screw 85 and is held slightly compressed, against the knife-valve 83, by the bearing of the screw-head thereupon. One extremity of the spring-member 86 engages a notch 87 in the knife-valve 83 adjacent the free end of the valve, and the other extremity rests against the surface of the knife-valve adjacent the screw 85 (as indicatd at 88), the intermediate portion being provided with an aperture through which the screw 85 extends. The spring-member 86 and the knife-valve 83 are so constructed and proportioned that tightening of the screw 85 places a slight end-compression upon the part of the spring-member extending between the screw 85 and the notch 87, so that that part of the spring-member reacts laterally against the screw 85 and, on the knife-valve, in a direction downwardly and away from the head of the screw 85. The other end of the spring-member is so shaped and proportioned that it reacts upwardly against the head of the screw 85 and downwardly against the knife-valve 83. On account of the compression in that part of the spring between the screw 85 and the notch 87, the free outer end of the knife-valve is held in proper engagement with the port-block 81.

Each knife-valve 83 has an arm or extension 89 which bears against an adjustable fulcrum-member 90. The fulcrum-member 90 comprises a rock-shaft 91 provided with a plurality of bearing-members 92, one for engagement with each of the arms or extensions 89 of the valves 83. Each of the arms or extensions 89 is held in engagement with its corresponding bearing-member 92 by means of a leaf-spring 93, secured to the respective arm 89 and bearing against a housing 94 which extends over and encloses the air-controlling mechanisms 41, 42, 43, 44 and 45.

The fulcrum-member 90 may be adjusted to vary the position of the bearing-members 92 by means of a manually operable lever 95 (Figs. 1, 12 and 13), connected by means of a link 96 to an arm 97 at the upper end of the fulcrum-member 90. For frictionally holding the lever 95 in any position to which it may be moved, a leaf-spring 98 (Figs. 12 and 13) is secured to the under side of the key-bed and bears against a collar 99 secured to the shaft-portion 100 of the lever 95. The pressure of this leaf-spring 98 against the collar 99 causes the handle-portion 101 of the lever 95 to bear against a friction-plate 102, secured to the key-bed to hold the handle-portion 101 in any desired position.

Each of the spring-mechanisms 84 for the bellows 79 comprises a pair of leaf-springs 103, one end of each spring of the pair being fixedly secured to the movable leaf of the bellows; a yoke-member 104, to which the other end of each of the pair of springs 103 is secured; and an adjusting-screw 105, threaded into a supporting-member 106, extending through an opening in the yoke-member 104, and held in place with respect thereto by means of a pair of nuts 107. The springs 103 for the different bellows may be made of different effective strengths in various ways, as, by varying the weight of the material used, by varying the number of leaves in the spring, and by varying the manner of attachment to the bellows. Instead of, or in addition to, this employment of springs of different strengths to act upon the different bellows, the bellows may be of relatively different sizes.

Figure 3:
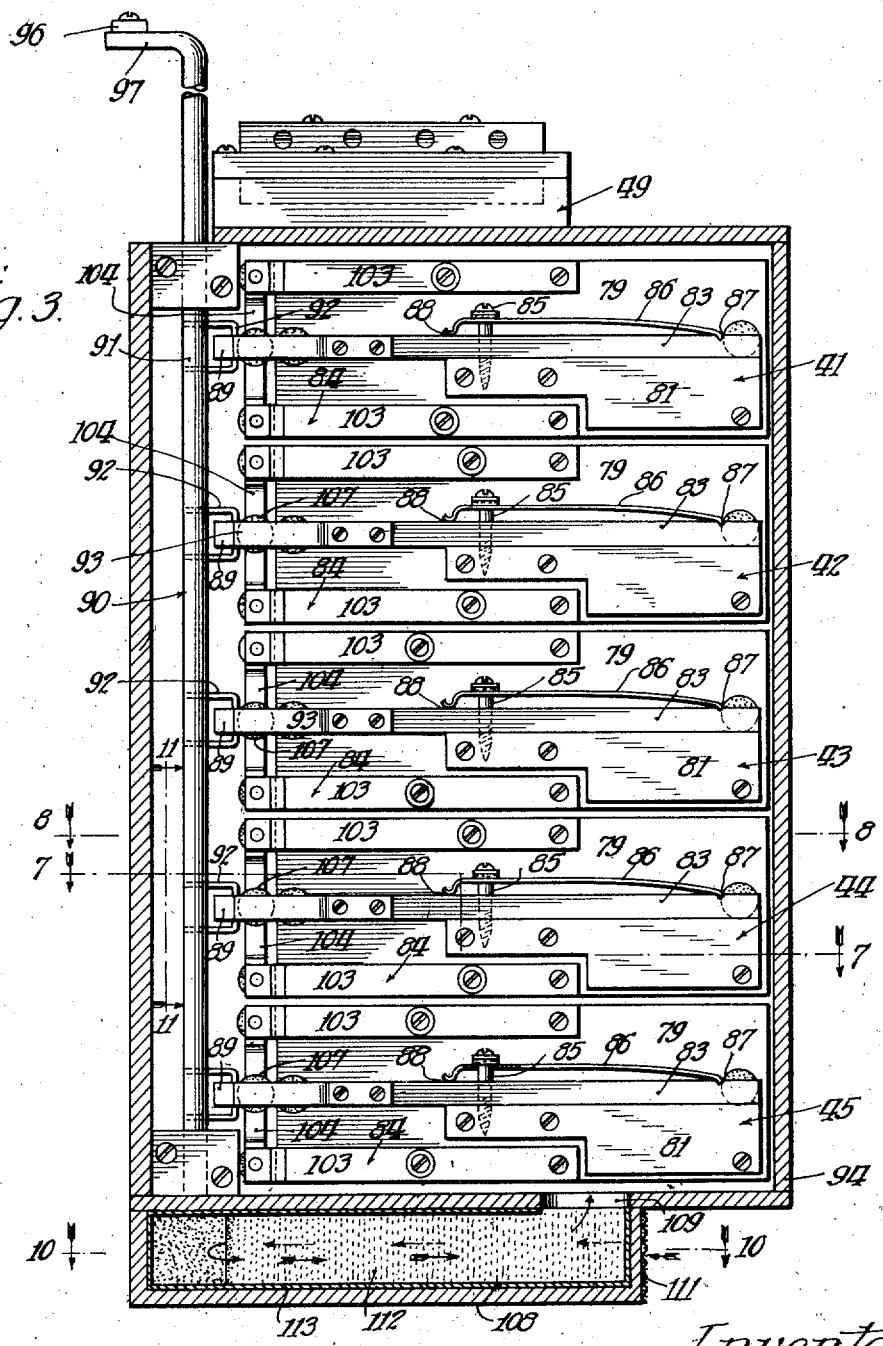
Fig. 3 is an elevation of the other side of the mechanism of Fig. 2, parts being removed to show the interior construction.
Figure 10:
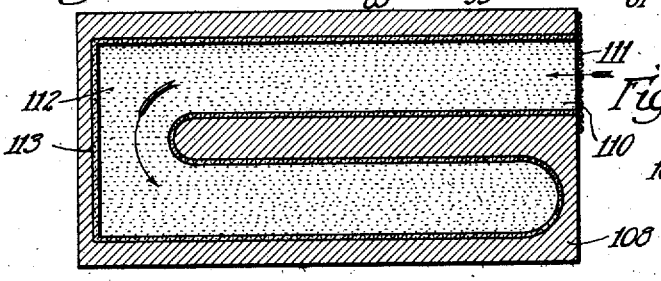
Fig. 10 is a horizontal section, on the line 10—10 of Fig. 3.
Figure 11:
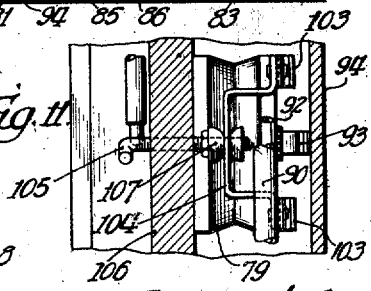
Fig. 11 is a vertical section, on the line 11—11 of Fig. 3.

Air is admitted to the housing 94, to supply the air-passages 82 in the port-blocks 81, through a muffler 108 located beneath the housing 94 (Figs. 3 and 10). This muffler is in communication with the housing 94 through a port 109, and with the atmosphere through a port 110 which may be covered with a screen 111. The U-shaped passage 112 of the muffler may be lined with felt 113.

The operation of my improved device is as follows: A suitably perforated music-roll 114 is placed in position in the roll-box 115 and its leader-end is attached to the take-up roll 116. This music-roll 114 is provided with suitable perforations for controlling the sounding of the notes and is also provided with suitable perforations for co-operating with those openings of the tracker 59 which are in communication with the conduits 65, 66, 67 and 68.

If it is desired that the pressure-controller 19 shall be controlled solely by the music-roll 114, the lever 75 is allowed to occupy the position shown in Fig. 1, in which the slide-valve 73 closes all of the ports 69, 70, 71 and 72.

The motor 18 is put in operation to actuate the air-pump 17 to withdraw air from the wind-chests of the instrument and produce a rarefaction of the air therein, whereby the striker-pneumatics and roll-motor may be operated.

To control the air-pressure in the action wind-chest, and consequently the loudness or volume with which the notes may be sounded, the pressure-controller 19 is operated to admit air more or less freely into the conduit 22, which communicates with the conduit 21. The freedom with which air is admitted to the conduit 22, through the pressure-controller 19, may be varied by selectively closing any one of the valve-mechanisms 32, 33, 34 or 35.

The air-admission-controlling mechanisms 41, 42, 43, 44 and 45 are so constructed that each requires a different degree of rarefaction of air to cause it to operate to open its valve 83 to admit air to its passage 82. This may be obtained in various ways, such as by the method I have described, i. e., that of opposing the collapse of the bellows 79 of the different controlling mechanisms by springs of relatively different strengths; or by the well-known alternative method I have mentioned, i. e., that of employing bellows 79 of relatively different sizes. The upper air-admission-controlling mechanism 41 operates under the least degree of rarefaction of air. The air-admission-controlling mechanism 42 requires a somewhat higher degree of rarefaction of air to cause its operation than does the mechanism 41, and so on down, the mechanism 45 requiring the highest degree of rarefaction of air for its operation.

When all of the ports 28, 29, 30 and 31 are open, the upper air-admission-controlling mechanism 41 controls the admission of air to the conduit 22. This air-admission-controller 41 operates, under a comparatively low degree of rarefaction of air, to admit atmospheric air through its passage 82. This admission of atmospheric air tends to prevent the air in the conduit 21 and, consequently, the air in the action wind-chest, from being still further rarefied. If air is being admitted to the action wind-chest in comparatively small quantities, as would be the case when comparatively few notes were being sounded, the operation of the pump 17 tends to cause a higher degree of rarefaction in the action wind-chest and, consequently, in the conduit 22, and this results in a further collapse of the bellows 79 of the air-admission-controller 41. This collapsing movement of the bellows 79 increases the opening of the valve 83 and allows a freer admission of atmospheric air to the passage 82, thus tending to prevent any higher degree of rarefaction of air in the conduits 22 and 21 and in the action wind-chest. If air is admitted in comparatively large quantities to the action wind-chest, as would be the case if a comparatively large number of notes were being sounded, it tends to lower the degree of rarefaction of air in the wind-chest and, consequently, in the conduits 21 and 22. This decrease in the rarefaction of air causes the bellows 79 of the controller 41 to expand somewhat to cause the valve 83 to move in a direction to restrict the admission of atmospheric air to the passage 82. This restriction of the admission of atmospheric air tends to prevent a further decrease of the rarefaction of air in the conduits 22 and 21 and, consequently, in the action wind-chest. The bellows 79 constitutes a chamber having a movable wall, the position of which varies with the degree of rarefaction of air.

The action of the other air-admission-controllers 42, 43, 44, and 45 is substantially the same as the operation of the controller 41, except that the controllers 42, 43, 44 and 45 operate under successively higher degrees of rarefaction of air.

Figure 2:
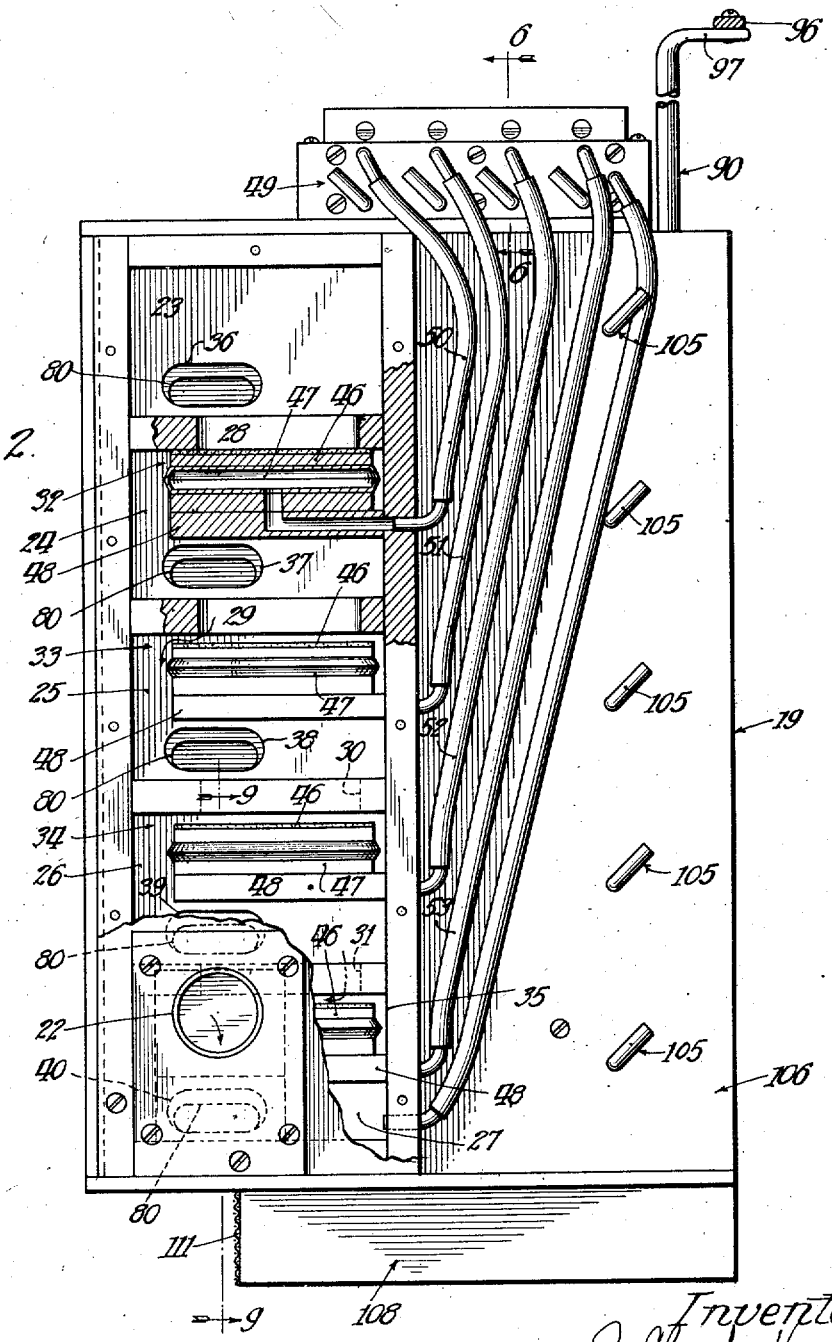
Fig. 2 is an elevation of one side of the air-pressure-controlling mechanism, parts being broken away to show the interior construction.

If the port 28 is closed, the ports 29, 30, and 31 remaining open, the air-admission-controller 42 is brought into operation to control the admission of air to the conduit 22 and, consequently, the degree of rarefaction of air which is maintained in the action wind-chest. This is the condition shown in Fig. 2, in which the flow of air, through the ports 29, 30, and 31 to the conduit 22, is indicated by arrows.

If the port 29 is closed, the ports 30 and 31 remaining open, the controller 43 becomes effective to control the degree of rarefaction of air in the action wind-chest.

If the port 30 is closed, the port 31 remaining open, the controller 44 is brought into operation to control the pressure. This is the condition shown in Fig. 9, in which the flow of air, past the valve 83, through the passage 82, ports 80, 39 and 31, chamber 27, and port 45[a], to the conduit 22, is indicated by arrows.

If the port 31 is closed, the controller 45 is brought into operation to control the air-pressure.

Thus the closing of each one of the ports 28, 29, 30 and 31 results in a difference in the freedom with which atmospheric air is admitted, and a consequent difference in the degree of rarefaction of the air in the conduit 21 and the action wind-chest.

The controllers 41, 42, 43, 44 and 45 can be individually adjusted to give the desired effect, by means of the screws 105, for adjusting the springs 103 to vary the degree of rarefaction of air required to collapse the bellows 79 to cause the valves 83 to uncover their respective ports.

Figure 7:
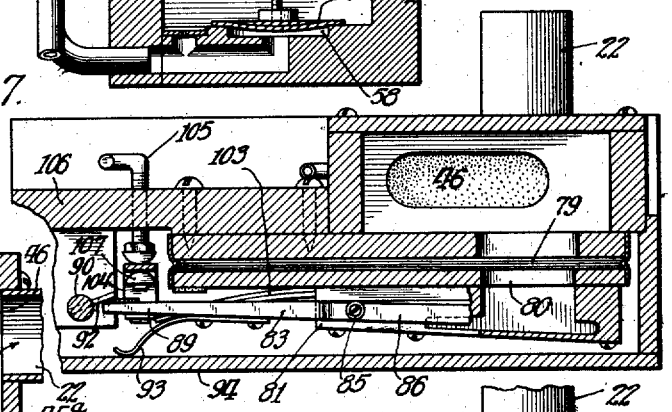
Fig. 7 is a horizontal section, on the line 7—7 of Fig. 3.
Figure 8:
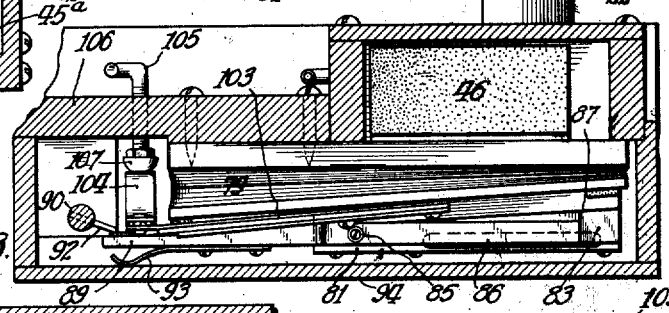
Fig. 8 is a horizontal section, on the line 8—8 of Fig. 3.

The controllers 41, 42, 43, 44 and 45 may be collectively adjusted by means of the fulcrum-member 90, which can be shifted to vary the position of the bearing-members 92 to vary the degree of collapse of the bellows 79 required to cause the valves 83 to open their ports. Thus, if the lever 95 is moved to the right, to the position marked "Light", in Fig. 1, the bearing-members 92 will be moved to the position shown in Fig. 8, which will cause the valves 83 to open on a comparatively slight degree of collapse of the bellows 79; while, if the lever is moved to the left, to the position marked "Heavy", the bearing-members 92 will be moved to the position shown in Fig. 7, in which the valves 83 will not be opened until the bellows 79 have been collapsed to a comparatively great extent and considerably greater strain has been placed upon the springs 103. Consequently, moving the lever 95 to the right (Fig. 1) will decrease the volume, and moving it to the left will increase the volume. Since the springs 103 for the different bellows 79 are of different strengths, the collective adjustment effected by means of the fulcrum-member 90 will affect the individual degrees of air-pressure controlled by the air-admission-controlling mechanisms 41, 42, 43, 44 and 45 differently. To explain further, a shifting of the fulcrum-member 90, to adjust the position of the bearing-members 92, will change the opening point of all of the knife-valves 83, and this change will be the same for all of the valves. But as the springs 103 for the different bellows are of different strengths, the change in air-tension, corresponding to the change in position at which the valves 83 open, will be different for the different mechanisms 41, 42, 43, 44 and 45.

For selectively closing the ports 28, 29, 30 and 31, for varying the pressure in the wind-chest, the music-roll 114 is provided with suitable perforations for selectively effecting the closing of the valve-mechanisms 32, 33, 34 and 35. Thus, if it is desired to bring the air-admission-controller 42 into operation to control the pressure of the air in the action wind-chest, the music-roll 114 is provided with a perforation through which air is admitted to the conduits 65 and 60 to cause the corresponding pneumatic 57 and valve 55 to be raised to admit air to the conduit 50 to cause the valve-mechanism 32 to close the port 28.

In a similar manner, any one of the controllers 41, 43, 44 or 45 can be brought into operation.

The same effects may be secured by operating the slide-valve 73 by means of the lever 75 to selectively admit air to the ports 69, 70, 71 or 72 and thus manually control the operation of the corresponding pneumatics 57 and valves 55. By this method of controlling the admission of air to the valve-mechanisms 32, 33, 34 and 35, the desired air-admission-controller may be brought into operation and the desired degree of rarefaction of the air in the action wind-chest be obtained under manual control.

Having thus described my invention, what I claim as new and desire to secure by Letters Patent is:

1. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and means for controlling the operation of one or more of the movable walls.

2. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and sheet-controlled means for controlling the operation of one of the movable walls.

3. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and means for selectively controlling the operation of one or more of the movable walls.

4. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and sheet-controlled means for selectively controlling the operation of one or more of the movable walls.

5. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and valve-means for controlling the communication between one of said chambers and the producer of rarefied air.

6. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and sheet-controlled valve-means for controlling the communication between one of said chambers and the producer of rarefied air.

7. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and a second valve-means for controlling said air-inlet-means.

8. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and sheet-controlled valve-means for controlling said air-inlet-means.

9. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and valve-means for selectively controlling the communication between one or more of said chambers and the producer of rarefied air.

10. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and sheet-controlled valve-means for selectively controlling the communication between one or more of said chambers and the producer of rarefied air.

11. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric air-inlets, valve-means controlling said air-inlets and separately controllable by the movable walls of said chambers, and a second valve-means for selectively controlling said air-inlets.

12. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric air-inlets, valve-means controlling said air-inlets and separately controllable by the movable walls of said chambers, and sheet-controlled valve-means for selectively controlling said air-inlets.

13. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a valve for each of said ports, each controlled by one of the movable walls, and a valve for controlling the communication between one of said chambers and the producer of rarefied air.

14. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a valve for each of said ports, each controlled by one of the movable walls, and a sheet-controlled valve for controlling the communication between one of said chambers and the producer of rarefied air.

15. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port and controlled by the movable wall, and a valve for controlling the communication between said chamber and the producer of rarefied air.

16. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port and controlled by the movable wall, and a sheet-controlled valve for controlling the communication between said chamber and the producer of rarefied air.

17. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefier air, a valve controlling said port and controlled by the movable wall, and a sheet-controlled valve for controlling the communication between said chamber and the producer of rarefied air.

18. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefied air, a valve controlling said port and controlled by the movable wall, and a valve for controlling the communication between said port and the producer of rarefied air.

19. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port and controlled by the movable wall, and valve-means for controlling the operation of said valve.

20. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefied air, a valve controlling said port and controlled by the movable wall, and a sheet-controlled valve for controlling the communication between said port and the producer of rarefied air.

21. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and valve-means for controlling the operation of said valve-means.

22. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port, means whereby the wall in its movement causes said valve to open said port, and adjustable setting-means through which the device may be set so that the movable wall will cause said valve to open said port at different degrees of rarefaction of the air.

23. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, a plurality of valve-means for controlling said air-inlet-means and separately controllable by the movable walls of said chambers, and valve-means for selectively controlling the operation of one or more of said valve-means.

24. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefied air, a valve controlling said port, means whereby the wall in its movement causes said valve to open said port, and adjustable setting-means through which the device may be set so that the movable wall will cause said valve to open said port at any predetermined one of a plurality of different positions of the movable wall.

25. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefied air, a valve controlling said port, means whereby the wall in its movement causes said valve to open said port, adjustable setting-means through which the device may be set so that the movable wall will cause said valve to open said port at different degrees of rarefaction of the air, and means for holding said setting-means in any one of a plurality of different positions.

26. A device for controlling air-pressure, comprising a plurality of chambers, each provided with a movable wall, means affording communication between each of said chambers and a producer of rarefied air, means whereby the position of each movable wall varies according to the degree of rarefaction of the air, an atmospheric port for each of said chambers in communication with the producer of rarefied air, a plurality of valves, one for each port, means whereby each wall in its movement causes one of said valves to open its port, adjustable setting-means through which the device may be set so that the respective movable wall will cause said one of said valves to open its port at different degrees of rarefaction of the air, and means for holding said setting-means in any one of a plurality of different positions.

27. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port, means whereby the wall in its movement causes said valve to open said port, adjustable setting-means through which the device may be set so that the movable wall will cause said valve to open said port at different degrees of rarefaction of the air, and means for holding said setting-means in any one of a plurality of different positions.

28. A device for controlling air-pressure, comprising a chamber provided with a movable wall, means affording communication between said chamber and a producer of rarefied air, means whereby the position of the movable wall varies according to the degree of rarefaction of the air, and atmospheric port in communication with the producer of rarefied air, a valve controlling said port, means whereby the wall in its movement causes said valve to open said port, adjustable setting-means through which the device may be set so that the movable wall will cause said valve to open said port at any predetermined one of a plurality of different positions of the movable wall, and means for holding said setting-means in any one of a plurality of different positions.

29. A device for controlling air-pressure, comprising a plurality of chambers, each provided with a movable wall, means affording communication between each of said chambers and a producer of rarefied air, means whereby the position of each movable wall varies according to the degree of rarefaction of the air, an atmospheric port for each of said chambers in communication with the producer of rarefied air, a plurality of valves, one for controlling each port, means whereby each wall in its movement causes one of said valves to open its port, adjustable setting-means through which the device may be set so that the respective movable wall will cause said one of said valves to open its port at any predetermined one of a plurality of different positions of the movable wall, and means for holding said setting-means in any one of a plurality of different positions.

30. A device for controlling air-pressure for musical instruments, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, and means whereby each wall in its movement causes one of said valves to open its port; each of said valves controlling the pressure for the same playing mechanism.

31. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, means whereby each wall in its movement causes one of said valves to open its port, and adjustable setting-means through which the device may be set so that each movable wall will cause one of said valves to open its port at different degrees of rarefaction of the air.

32. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, means whereby each wall in its movement causes one of said valves to open its port, and adjustable setting-means through which the device may be set so that each movable wall will cause one of said valves to open its port at a different degree of rarefaction of the air from that at which another movable wall causes the opening of its port.

33. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, means whereby each wall in its movement causes one of said valves to open its port, and adjustable setting-means through which the device may be set so that each movable wall will cause one of said valves to open its port at any one of a plurality of different degrees of rarefaction of the air; said setting-means being constructed to control said valves collectively.

34. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports, one for each of said chambers; a plurality of valves, one for each of said ports; means whereby each wall in its movement causes one of said valves to open its port; adjustable setting-means through which the device may be set so that each movable wall will cause one of said valves to open its port at any one of a plurality of different degrees of rarefaction of the air, said setting-means being constructed to control said valves collectively; and a valve for controlling the communication between one of said chambers and the producer of rarefied air.

35. A device for controlling air-pressure, comprising a plurality of chambers, each provided with a movable wall; means affording communication between each of said chambers and a producer of rarefied air; means whereby the position of each movable wall varies according to the degree of rarefaction of the air; atmospheric air-inlet-means; a plurality of valve-means controlling said air-inlet-means controlled by the movable walls of said chambers; adjustable setting-means through which the device may be set so that each movable wall will cause one of said valve-means to open said air-inlet-means at any one of a plurality of different degrees of rarefaction of the air, said setting-means being constructed to control said valve-means collectively; and a second valve-means for controlling said air-inlet-means.

36. A device for controlling air-pressure, comprising a plurality of chambers, each provided with a movable wall; means affording communication between each of said chambers and a producer of rarefied air; means whereby the position of each movable wall varies according to the degree of rarefaction of the air; atmospheric air-inlet-means; a plurality of valve-means controlling said air-inlet-means controlled by the movable walls of said chambers; adjustable setting-means through which the device may be set so that each movable wall will cause one of said valve-means to open said air-inlet-means at any one of a plurality of different degrees of rarefaction of the air, said setting-means being constructed to control said valve-means collectively; and a sheet-controlled valve-means for controlling said air-inlet-means.

37. A device for controlling air-pressure, comprising a plurality of chambers, each provided with a movable wall; means affording communication between each of said chambers and a producer of rarefied air; means whereby the position of each movable wall varies according to the degree of rarefaction of the air; atmospheric air-inlet-means; a plurality of valve-means controlling said air-inlet-means controlled by the movable walls of said chambers; adjustable setting-means through which the device may be set so that each movable wall will cause one of said valve-means to open said air-inlet-means at any one of a plurality of different degrees of rarefaction of the air, said setting-means being constructed to control said valve-means individually; and a second valve-means for controlling said air-inlet-means.

38. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports, one for each of said chambers; a plurality of valves, one for each of said ports; means whereby each wall in its movement causes one of said valves to open its port; adjustable setting-means through which the device may be set so that each movable wall will cause one of said valves to open its port at any one of a plurality of different degrees of rarefaction of the air, said setting-means being constructed to control said valves collectively; and a valve for controlling the communication between one of said ports and the producer of rarefied air.

39. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, means whereby each wall in its movement causes one of said valves to open its port, and adjustable setting-means through which the device may be set so that each movable wall will cause one of said valves to open its port at any one of a plurality of different degrees of rarefaction of the air; said setting-means being constructed to control said valves individually.

40. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports, one for each of said chambers; a plurality of valves, one for each of said ports; means whereby each wall in its movement causes one of said valves to open its port; adjustable setting-means through which the device may be set so that each movable wall will cause one of said valves to open its port at any one of a plurality of different degrees of rarefaction of the air, said setting-means being constructed to control said valves individually; and a valve for controlling the communication between one of said chambers and the producer of rarefied air.

41. A device for controlling air-pressure, comprising a bellows having a movable leaf, means affording communication between said bellows and a producer of rarefied air, means whereby the position of the movable leaf varies according to the degree of rarefaction of the air, an atmospheric port carried by the movable leaf and communicating with the interior of said bellows, a valve-member pivotally mounted on the movable leaf for controlling said port, and an adjustable fulcrum-member for controlling the movement of said valve-member.

42. A device for controlling air-pressure, comprising a plurality of bellows, each having a movable leaf; means affording communication between each of said bellows and a producer of rarefied air; atmospheric ports, one communicating with the interior of each of said bellows, respectively; a plurality of valve-members, one pivotally mounted on each movable leaf, for controlling said atmospheric ports; and adjustable fulcrum-means for controlling the movement of said valve-members collectively.

43. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, and means whereby each wall in its movement causes one of said valves to open its port; said device being constructed so that the respective ports will be opened under different degrees of rarefaction of air.

44. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports, one for each of said chambers; a plurality of valves, one for each of said ports; means whereby each wall in its movement causes one of said valves to open its port, said device being constructed so that the respective ports will be opened under different degrees of rarefaction of air; and a valve for controlling communication between one of said chambers and the producer of rarefied air.

45. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports communicating with the producer of rarefied air, one for each of said chambers; a plurality of valves, one for each of said ports; means whereby each wall in its movement causes one of said valves to open its port, said device being constructed so that the respective ports will be opened under different degrees of rarefaction of air; and a valve for controlling communication between one of said ports and the producer of rarefied air.

46. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports communicating with the producer of rarefied air, one for each of said chambers; a plurality of valves, one for each of said ports; means whereby each wall in its movement causes one of said valves to open its port, said device being constructed so that the respective ports will be opened under different degrees of rarefaction of air; and a sheet-controlled valve for controlling communication betwen one of said ports and the producer of rarefied air.

47. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefied air, a valve controlling said port and controlled by the movable wall, and controlling-means between said port and the producer of rarefied air for rendering said port inoperative to supply air to the producer of rarefied air.

48. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports, one for each of said chambers; a valve for each of said ports, each controlled by one of the movable walls; and controlling-means for rendering one of said ports inoperative to supply air to the producer of rarefied air.

49. A device for controlling air-pressure, comprising a plurality of chambers, each provided with a movable wall; means affording communication between each of said chambers and a producer of rarefied air; means whereby the position of each movable wall varies according to the degree of rarefaction of the air; a plurality of atmospheric ports, one for each of said chambers; a valve for each of said ports, each controlled by one of the movable walls; and sheet-controlled controlling-means for rendering one of said ports inoperative to supply air to the producer of rarefied air.

50. A device for controlling air-pressure, comprising two chambers; means affording communication between one of said chambers and a producer of rarefied air; a port affording communication between said chambers; a valve controlling said port; two atmospheric ports, one communicating with each of said chambers; two valves, one for each of said atmospheric ports; two movable members, one for controlling each of said two valves; and means whereby the position of said movable members varies with the degree of rarefaction of the air.

51. A device for controlling air-pressure, comprising two chambers; means affording communication between one of said chambers and a producer of rarefied air; a port affording communication between said chambers; a valve controlling said port; two bellows, one in communication with each of said chambers; two atmospheric ports, one communicating with each of said chambers; and a valve for each of said atmospheric ports, one controlled by each of said bellows.

52. A device for controlling air-pressure, comprising two chambers; means affording communication between one of said chambers and a producer of rarefied air; a port affording communication between said chambers; a valve controlling said port; a pneumatic controlling said valve; two bellows, one in communication with each of said chambers; two atmospheric ports, one communicating with each of said chambers; and a valve for each of said atmospheric ports, one controlled by each of said bellows.

53. An expression-device for automatic musical instruments, comprising a member adjustable for varying the expression, and manual means for actuating said member and holding it in adjusted position, comprising a rock-shaft, a handle upon said rock-shaft, a bearing-member along which said handle moves, and spring-means for forcing said rock-shaft longitudinally to cause said handle to bear against said bearing-member.

54. A device for controlling air-pressure, comprising a bellows having a movable leaf, means affording communication between said bellows and a producer of rarefied air, means whereby the position of the movable leaf varies according to the degree of rarefaction of the air, an atmospheric port carried by the movable leaf and communicating with the interior of said bellows, a valve-member pivotally mounted on the movable leaf for controlling said port, an adjustable fulcrum-member for controlling the movement of said valve-member, and spring-means for holding said valve-member against said fulcrum-member.

55. A valve-mechanism comprising a pivoted valve, a pivot-post on which said valve is mounted, and a compression-member, extending between the outer portion of said pivot-post and the free end of said valve, and reacting laterally on said pivot-post and inwardly and away from said pivot-post on said valve.

56. A valve-mechanism comprising a pivoted valve, a pivot-post on which said valve is mounted, and a spring compression-member, extending between the outer portion of said pivot-post and the free end of said valve, and reacting laterally on said pivot-post and inwardly and away from said pivot-post on said valve.

57. A valve-mechanism comprising a pivoted valve-member; a pivot-post; and a spring-member, comprising a spring compression-portion extending between the outer portion of said pivot-post and the free end of said valve-member and reacting laterally on said pivot-post and inwardly and away from said pivot-post on said valve-member, and a portion extending from said pivot-post on the side opposite from said compression-portion and reacting inwardly on said valve-member and outwardly on said pivot-post.

58. A device for controlling air-pressure for musical instruments, having means for controlling air-pressure at any one of a plurality of predetermined, selectable, individually different degrees, and means for adjusting said device to vary individually, with relation to each other, and collectively, as a whole, the degrees of air-pressure controlled thereby, the collective adjustment affecting the individual degrees of air-pressure differently.

59. A device for controlling air-pressure for musical instruments, having means for controlling air-pressure at any one of a plurality of predetermined, selectable, individually different degrees, means for adjusting said device to vary individually, with relation to each other, the different degrees of air-pressure-control, and other means for adjusting said device to vary collectively, as a whole, the different degrees of air-pressure-control, the collective adjustment affecting the individual degrees of air-pressure differently.

60. A device for controlling air-pressure for musical instruments, comprising individual regulator-units capable of controlling air-pressure at individually different degrees, and means for separately and collectively adjusting said individual regulator-units and the degrees of air-pressure controllable thereby.

61. A device for controlling air-pressure for musical instruments, comprising individual regulator-units capable of controlling air-pressure at individually different degrees, means for separately adjusting said individual regulator-units and the degrees of air-pressure controllable thereby, and other means for collectively adjusting said individual regulator-units and the degrees of air-pressure controllable thereby.

62. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, means whereby each wall in its movement causes one of said valves to open its port, and adjustable setting-means through which the device may be set so that, compared with each other, the movable walls will cause the opening of their respective ports at different degrees of rarefaction of the air, and so that each movable wall will cause the opening of its port at any predetermined one of a plurality of different positions of the movable wall.

63. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefied air, a valve controlling said port, means whereby the wall in its movement causes said valve to open said port, adjustable means through which the device may be set so that the movable wall will cause said valve to open said port at different degrees of rarefaction of the air, and other adjustable means through which the device may be set so that the movable wall will cause said valve to open said port at any predetermned one of a plurality of different positions of the movable wall.

64. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, means whereby each wall in its movement causes one of said valves to open its port, adjustable means through which the device may be set so that, compared with each other, the movable walls will cause the opening of their respective ports at different degrees of rarefaction of the air, and other adjustable means through which the device may be set so that each movable wall will cause the opening of its port at any predetermined one of a plurality of different positions of the movable wall.

65. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with the producer of rarefied air, a valve controlling said port, means whereby the wall in its movement causes said valve to open said port, and adjustable means through which the device may be set so that the movable wall will cause said valve to open said port at any predetermined one of a plurality of different positions of the movable wall at different degrees of rarefaction of the air.

66. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port and controlled by the movable wall, and means for controlling the operation of said valve.

67. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and means for controlling the operation of said valve-means.

68. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, valve-means controlling said air-inlet-means and separately controllable by the movable walls of said chambers, and sheet-controlled means for controlling the operation of said valve-means.

69. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, a plurality of valve-means controlling said air-inlet-means and separately controllable by the movable walls of said chambers, and means for selectively controlling the operation of one or more of said valve-means.

70. A device for controlling air-pressure, comprising a plurality of chambers, each provided with a movable wall, means affording communication between each of said chambers and a producer of rarefied air, means whereby the position of each movable wall varies according to the degree of rarefaction of the air, atmospheric air-inlet-means, a plurality of valve-means controlling said air-inlet means and separately controllable by the movable walls of said chambers, and sheet-controlled means for selectively controlling the operation of one or more of said valve-means.

71. A device for controlling air-pressure, comprising a plurality of chambers, each provided with a movable wall, means affording communication between each of said chambers and a producer of rarefied air, means whereby the position of each movable wall varies according to the degree of rarefaction of the air, a plurality of atmospheric ports, one for each of said chambers, a plurality of valves, one for each of said ports, means whereby each wall in its movement causes one of said valves to open its port, and adjustable means through which the device may be set so that, compared with each other, a plurality of the movable walls will cause the opening of their respective ports at relatively similar positions but at different predetermined degrees of rarefaction of the air, each of which positions may be any predetermined one of a plurality of different positions of said movable walls.

72. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port and controlled by the movable wall, and means for controlling the operation of the movable wall.

73. A device for controlling air-pressure, comprising a chamber provided with a movable wall, means affording communication between said chamber and a producer of rarefied air, means whereby the position of the movable wall varies according to the degree of rarefaction of the air, an atmospheric port in communication with said chamber, a valve controlling said port and controlled by the movable wall, and sheet-controlled means for controlling the operation of the movable wall.

74. A device for controlling air-pressure for musical instruments, comprising a plurality of regulators, each comprising a chamber having a movable wall and a valve controlled by the wall; means for controlling the chambers individually; and means for controlling the valves collectively.

75. A device for controlling air-pressure for musical instruments, comprising a plurality of regulators, each comprising a port, a valve for controlling the port, and a chamber having a movable wall for controlling the valve; and means for individually controlling the ports and for collectively controlling the valves.

76. A device for controlling air-pressure for musical instruments, comprising a plurality of regulators, each comprising an atmospheric port and a valve for controlling the port; and means for individually controlling the ports and for collectively controlling the valves.

77. A device for controlling air-pressure for musical instruments, comprising a plurality of regulators, and means for adjusting said device to vary collectively the degrees of air-pressure controlled by said regulators.

78. A device for controlling air-pressure for musical instruments, comprising a plurality of regulators, and means for adjusting said device to vary collectively the degrees of air-pressure controlled by said regulators, the collective adjustment affecting the individual degrees of air-pressure differently.

79. A device for controlling air-pressure for musical instruments, comprising a plurality of regulators for controlling the admission of atmospheric air, and means for adjusting said device to vary collectively the degrees of air-pressure controlled by said regulators.

80. A device for controlling air-pressure for musical instruments, comprising a plurality of regulators for controlling the admission of atmospheric air to cause different degrees of air-pressure respectively, and means for adjusting said device to vary collectively the degrees of air-pressure controlled by said regulators, the collective adjustment affecting the individual degrees of air-pressure differently.

81. A device for controlling air-pressure for musical instruments, comprising a plurality of regulators, each comprising a chamber having a movable wall and a valve controlled by the wall, and means for controlling the valves collectively.

82. In an automatic musical instrument, the combination of a main source of power; a bellows provided with a port to atmosphere and having communication with the main source of power; a valve to control admission of atmosphere to said bellows; an abutment against which said valve normally bears; and means to move said abutment to produce changes in playing intensities.

In witness whereof, I have hereunto subscribed my name.

J. CLARKE HAGEY.